June 20, 1961 V. WEBER ET AL 2,989,611
THERMOSTATIC CONTROL DEVICE
Filed Oct. 14, 1958 4 Sheets-Sheet 1

United States Patent Office 2,989,611
Patented June 20, 1961

2,989,611
THERMOSTATIC CONTROL DEVICE
Victor Weber, Greensburg, and Charles K. Strobel, Pittsburgh, Pa., assignors to Robertshaw-Fulton Controls Company, Richmond, Va., a corporation of Delaware
Filed Oct. 14, 1958, Ser. No. 767,203
6 Claims. (Cl. 200—137)

This invention relates to thermostatic control devices and more particularly to devices adapted for shutting off a heater when the internal temperature of a material being heated reaches a predetermined degree.

It is an object of this invention to terminate the heating of a material when the temperature thereof reaches a predetermined degree.

Another object of this invention is to control a gas heater or an electric heater in accordance with the internal temperature of a material being heated thereby.

A further object of this invention is to indicate concurrently with the heating operation the internal temperature of the material being heated.

Briefly stated, in the preferred embodiment of this invention, a temperature responsive control device is provided which is adapted to be inserted into the interior of the material being heated. The movement of a temperature sensitive element disposed within the interior of the material is amplified and causes a retaining mechanism to actuate switch means to shut off the heating means when the material has reached the desired temperature. This temperature is determined by the relative position between the retaining means and the switch means. An adjusting means is provided to regulate this relative position. To indicate the internal temperature of the material, an indicator is operatively connected to the motion amplifying means and moves in response to movement thereof through a series of positions corresponding to the internal temperature.

Further objects and advantages will be apparent from the following description taken in connection with the drawings wherein.

Figure 2:
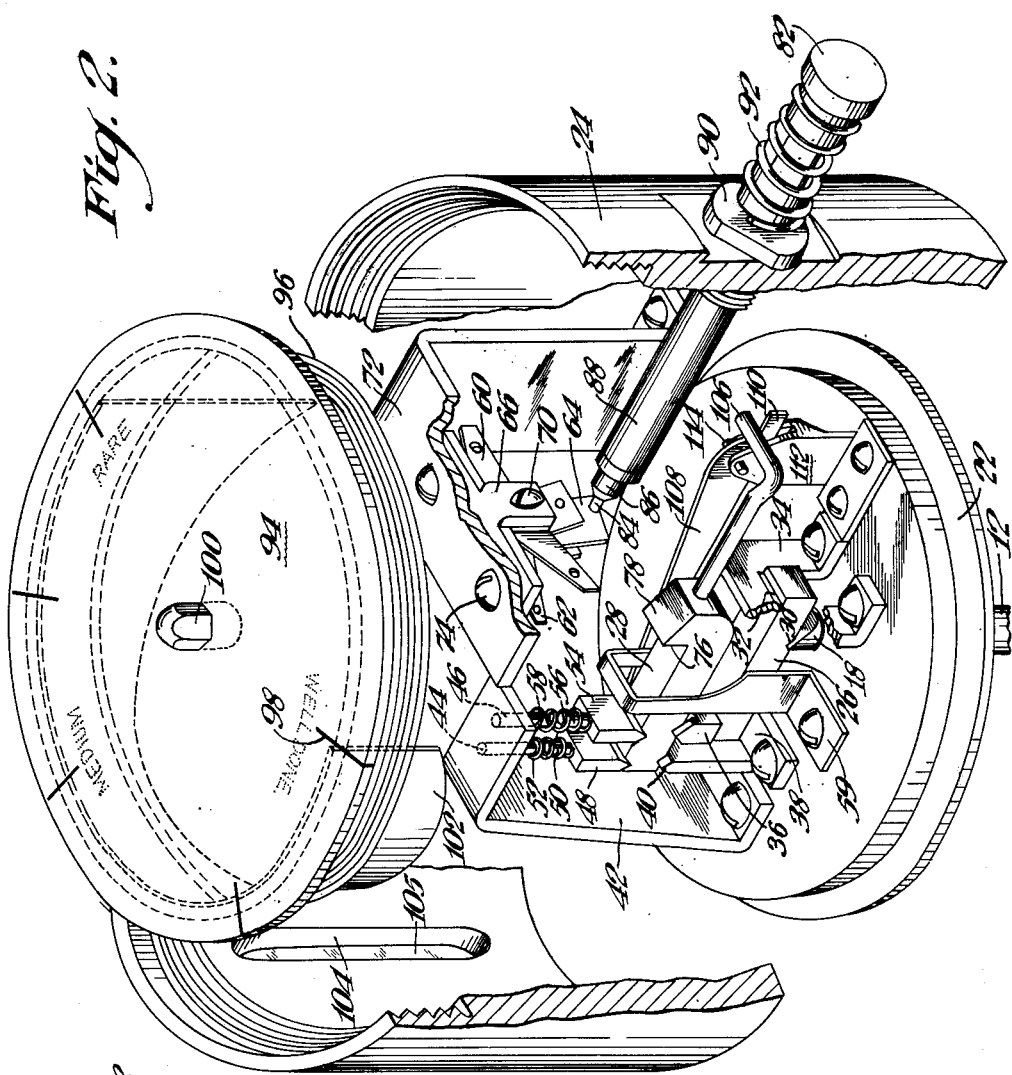
FIG. 2 is an enlarged isometric view with portions broken away of a detail of the device shown in FIG. 1.

Referring now more particularly to the drawings, a temperature responsive control device is indicated generally by reference numeral 10. It will be apparent that the device hereinafter described is applicable to many heating processes where the internal temperature of the material being heated is the controlling factor; however, the following description is made with reference to the particular application of cooking a roast such as meat within an oven. In such an application, the temperature responsive device 10 is more commonly referred to as a meat probe and is provided with a tube 12 having a skewer point 14 formed integral therewith of a material, preferably stainless steel, which will not react with the meat. The tube 12 is adapted to be inserted into the interior of the meat. A temperature sensitive element 16 is disposed within tube 12 with one end abutting the inner surface of skewer 14 and with the side walls thereof in close proximity to the inner walls of tube 12 in a heat conducting relationship, so that the temperature thereof corresponds to that of the surrounding medium. The temperature sensitive element 16 is preferably formed of a ceramic material having a negative coefficient of thermal expansion. It will be apparent, however, that with obvious changes, the device can be made to operate with a temperature sensitive element 16 formed of material having a positive coefficient of thermal expansion.

A rod 18 is slidably disposed within tube 12 and has one end thereof abutting the upper end of element 16. Rod 18 extends from element 16 through tube 12, through an aperture 20 formed in a bottom wall 22, into the interior of casing 24, and terminates in a V-shaped end. Expansion and contraction of element 16 causes the V-shaped end of rod 18 to move relative to housing 24. To compensate for the effect caused by portions of tube 12 and rod 18 being exposed to oven temperatures higher than the temperatures of the portions of tube 12 and rod 18 inserted into the roast, rod 18 and tube 12 are preferably formed of the same material, or of different materials having the same coefficient of thermal expansion.

Motion transmitting means are provided to increase the amplitude of relative movement between rod 18 and casing 24 and comprise a pair of levers 26 and 28 which are so constructed and arranged that a small movement applied to a portion of lever 26 will result in a much larger movement of a portion of lever 28. Lever 26 abuts the V-shaped end of rod 18 in a transverse groove 30 formed in the underside of lever 26. A knife edge fulcrum 32 is formed on an inverted U-shaped bracket 24 connected to bottom wall 22 by screw means. The other end of lever 26 is formed with an upstanding projection 36 which has V-shaped portions disposed on either side of lever 28 to prevent lateral movement thereof. A knife edge 37, formed between these V-shaped portions of member 36, underlies lever 28 and is the actuating means for transmitting movement from lever 26 to lever 28. A stationary fulcrum is provided for lever 28 and comprises a bracket 38 attached to bottom wall 22 and has an upstanding portion that terminates in a knife edge 40 which contacts the underside of lever 28. An upstanding bracket 42 is similarly attached to bottom wall 22 and has a pair of pins 44 and 46 which extend from a portion thereof towards lever 28.

Figure 1:
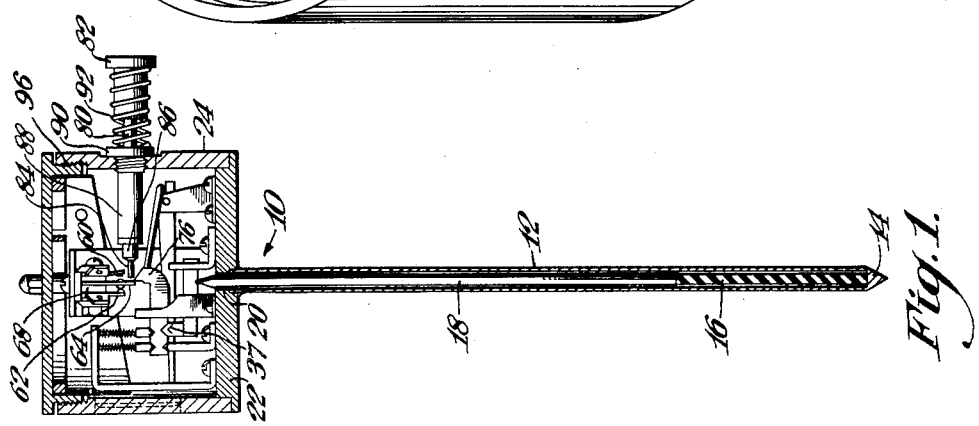
FIG. 1 is a longitudinal cross-section of an embodiment of this invention.

A knife edge member 48 rests in a groove formed on the topside of lever 28 and has a pin 50 which extends towards pin 44. A helical spring 52 is disposed around pins 50 and 44 and biases knife edge member 48 into contact with lever 28. The force which knife edge 48 applies to lever 28 is directly over knife edge 40 and biases lever 28 into engagement therewith. A second knife edge member 54 abuts the top side of lever 28 and has a pin 56 formed therewith which extends upwardly towards pin 46. A helical spring 58 disposed around pins 56 and 46 biases knife edge member 54 into engagement with lever 28. The line of force is slightly to the left of the line of force transmitted from lever 26 at knife edge 37, as shown in FIG. 1.

It should be noted that spring 58 tends to pivot lever 28 in a clockwise direction about knife edge 40 and in so doing biases lever 26 in a counterclockwise direction about knife edge 32 and thereby biases rod 18 into contact with temperature sensitive element 16. Whereas element 16 moves rod 18 upwardly upon expansion thereof, spring 58 acts as a return spring and causes rod 18 to move downwardly in response to contraction of element 16. Furthermore, it should be noted that pins 50 and 44 and pins 56 and 46 terminate short of one another so that knife edge members 48 and 54 may move slightly towards the portion of bracket 42 from which pins 44 and 46 depend. An inverted U-shaped bracket 59 is mounted on bottom wall 22 and is disposed with the legs thereof adjacent levers 26 and 28 to prevent lateral movement thereof.

Switch means comprising a single-pole, double-throw switch are disposed in casing 24 and comprise a pair of stationary contact members 60 and 62 disposed on either side of a movable switch member 64. Switch member 64 is normally biased into engagement with contact 60. The switch elements 60, 62, and 64 are electrically insulated from one another and are mounted on a bracket 66 by a nut and bolt assembly 70. Insulation blocks 68 cooperate with nut and bolt assembly 70 to maintain the switch members in a spaced relationship. Bracket 66, being formed of insulation material, is in turn connected to a flexible bracket 72 by a plurality of screws 74. Bracket 72 is connected to the base of casing 24 and is so constructed and arranged that switch member 64 will move in a substantially vertical plane when a force is applied to the top of bracket 72.

The switch member 64 is engageable by a retaining means comprising a detent member 76 mounted on the end of lever 28. Detent 76 is provided with a cam surface 78 by means of which switch member 64 may be moved from engagement with contact 60 into engagement with contact 62. When the temperature sensitive element 16 is at the lower temperature such that the upper edge of detent 76 is above the lower edge of switch member 64 and switch member 64 is moved towards engagement with contact 62, the lower edge of switch member 64 will contact cam surface 78 forcing lever 28 to pivot about knife edge 37 against the bias of springs 52 and 58, in a clockwise direction until such time as the lower edge of switch member 64 passes over the upper edge of cam surface 78 whereupon lever 28 will rotate in a counterclockwise direction to its normal position. At the moment of passing over the edge of cam 78, switch member 64 will engage contact 62, and detent 76. Switch member 64 will be held in engagement with contact 62 until such time as the temperature of element 16 has increased and the detent 76 has moved downwardly until it disengages or releases switch member 64. Upon release, switch member 64 moves with a snap-action.

Although the switch means has been described as a single-pole, double-throw type, it can easily be converted into a single-pole, single-throw type by removing either contact member 60 or 62 from the assembly. If contact member 60 is removed, the switch means will be closed during heating and will open upon reaching the desired temperature; whereas, if contact member 62 is removed, the switch means will be normally open during heating and will close when the desired temperature has been attained. In all cases, a two or three wire cable (not shown in detail) is connected to the switch means by a conventional method and passes through casing 24 in a sealed connection to permit immersion of the unit in a liquid for cleaning purposes. The cable is connected at the other end to a conventional two or three way plug.

To move member 64 from engagement with contact 60 into engagement with contact 62, reset means are provided which comprises a plunger 80 having a push button 82 formed at the outer end thereof and a nipple 84 formed on the inner end adapted to engage switch member 64. An enlarged portion 86 of plunger 80 forms a stop member which may abut a tube 88, mounted by connecting means 90 on casing 24, to prevent the bias of spring 92 from causing plunger 80 to move out of tube 88. Spring 92 acts as a return spring when push button 82 is depressed to move switch member 64 into retention by detent 76.

It should be noted that the position of detent 76 relative to switch member 64 is directly proportional to the temperature of temperature sensitive element 16, and that dependent upon any given relative position, the temperature at which detent 76 will release switch member 64 for movement between positions is fixed. To vary the temperature of release, adjusting means are provided which comprise a dial 94 formed with a threaded portion 96 adapted to be received in a threaded portion of casing 24.

Dial 94 has indicia 98 formed thereon, which may be calibrated in terms of temperature or in degree of rarity of meat such as, for example, "rare," "medium," or "well done." A knob 100 extends through the dial 94 and extends into engagement with bracket 72. Rotation of the dial 94 causes the knob 100 to move into or out of the casing 24 and in so doing, causes bracket 72 to move in a substantially vertical plane to change the position of switch member 64 relative to detent 76. A helical indicator plate 102 is mounted on the underside surface of dial 94 and cooperates with an opening 104, formed in casing 24 and having a window or glass pane 105 mounted therein, to give an indication of the temperature setting of the adjusting means. Rotation of the dial 94 changes the amount of helical plate 102 which may be seen through the window 105 which corresponds to the temperature setting of dial 104.

Indicating means are provided to give a rough visual indication of the temperature of the meat and comprises an L-shaped actuator 106 which is mounted upon lever 28 and extends therefrom into engagement with a pivoted indicator 108 which has an extension lug 110 formed therewith to engage actuator 106. Indicator 108 is pivoted by a shaft 114 mounted upon a bracket 112 which in turn is connected to bottom wall 22. Indicator 108 extends from bracket 112 and has a pointer (not shown) which moves behind window 105.

It should be noted that when an increase in temperature causes lever 28 to pivot in a clockwise direction whereby actuator 106 will move downwardly, spring 58 will cause indicator 108 to pivot in a clockwise direction whereas upon a decrease in temperature, the action of gravity will cause indicator 108 to pivot in a counter-clockwise direction. The distance between the indicator 108 and the lower edge of helical plate 102 gives a rough indication of the progress of the cooking, whereas the distance from pointer 108 to the bottom edge of window 105 roughly corresponds to the temperature of element 16.

Figure 3:
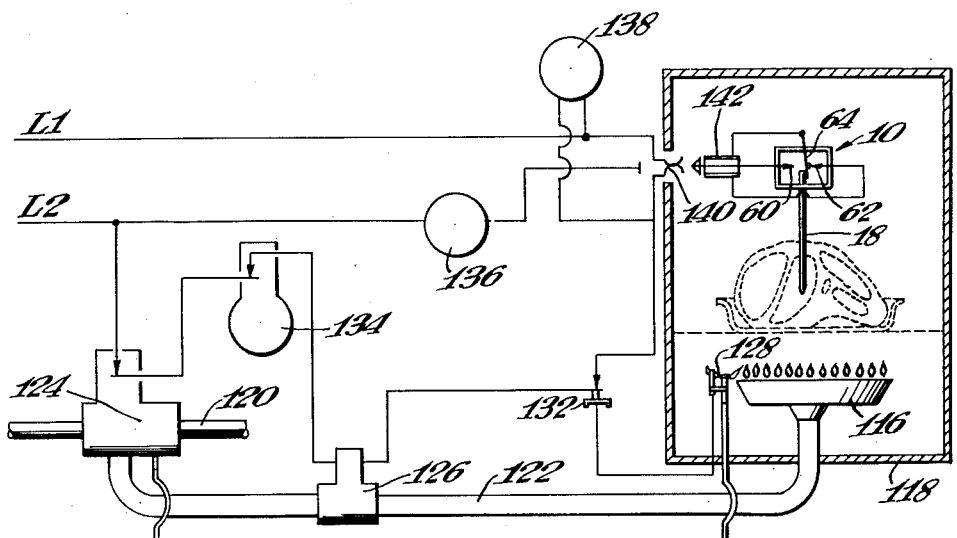
FIG. 3 is a schematic view of one system embodying this invention.

As shown in FIG. 3, a main gas burner 116 is disposed within an oven 118. The supply of fuel from a gas line 120 through a line 122 is controlled by a conventional thermostat 124 and a solenoid-operated valve 126. Thermostat 124 has means associated therewith for maintaining the oven temperature at a preselected level, valve means for regulating the fuel flow and switch means for placing thermostat 124 into operation when the switch means are closed whereby fuel may flow to burner 116.

A pilot burner 128 is disposed adjacent main burner 116 and has conventional safety means associated therewith which actuate a safety mercury switch 132. When a flame exists at the pilot burner, the safety switch 132 is closed; however, should the pilot flame go out, the switch will open. An audible or visual alarm is indicated by reference numeral 136 whereas reference numeral 138 refers to a high-resistance neon light.

The cable extending from temperature responsive device 10 is connected to a three-way plug 142 which cooperates with a suitable receiving device or jack 140 within the walls of oven 118. A clock 134 has a switch associated therewith which may be set for a delayed start so that the switch contacts will be closed after the lapse of a preset period or the contacts may be closed for manual operation without the time delay.

For cooking, the meat probe 18 is inserted into the interior of the roast and reset plunger 80 is depressed to cause switch member 64 to move into engagement with contact 62 and with detent 76. Dial 94 is rotated to the desired setting and thermostat 124 is set to the desired oven temperature. Plug 142 is inserted into jack 140. When the clock contacts close, current flows serially from power line L2 through thermostat 124, clock 134, solenoid valve 126, safety switch 132, contact 62, switch member 64, plug 142, jack 140, to L1. With the solenoid valve 126 energized, the gas flows to burner 116 and the oven heats up under the control of thermostat 124.

As the temperature of the meat increases, temperature sensitive element 16 contracts whereupon detent 76 pivots in a clockwise direction. When the temperature has reached the temperature which corresponds to the setting of dial 94, detent 76 will release switch member 64 whereupon the bias thereof will cause switch member 64 to snap into engagement with contact 60. The neon light 138 formerly short circuited by the temperature responsive device 10 through contact 62 is now serially connected with the mercury switch 132, solenoid valve 126, clock 134 and thermostat 124. Because of the high resistance of light 138, the power is insufficient to maintain solenoid valve 126 in an open position and it closes to stop the flow of gas to burner 116. Also, upon the closing of contact 60, the alarm 136 is connected between power lines L1 and L2 and may serve to notify the cook that the meat has reached the desired temperature.

It should be noted that the oven 118 may be used without connecting the temperature responsive device 10. Without plug 142 inserted into jack 140, the contacts thereof are closed and a series circuit is formed between power lines L1 and L2 which comprises the thermostat 124, clock 134, solenoid 126, and safety switch 132. The cooking is done either in accordance with time or by manual operation, dependent upon the setting of clock 134.

If for some reason the cook is not able to remove the roast from the oven when it has reached the desired temperature, and the temperature of the oven and the roast decreases, the temperature responsive device 10 will be ineffective to reenergize solenoid valve 126 since switch member 64 will be in engagement with contact 60. It would be necessary to manually reset switch member 64 before the device may be used again. Thus, it acts as a hold device to prevent a resultant overheating or over cooking of the roast.

Figure 4:
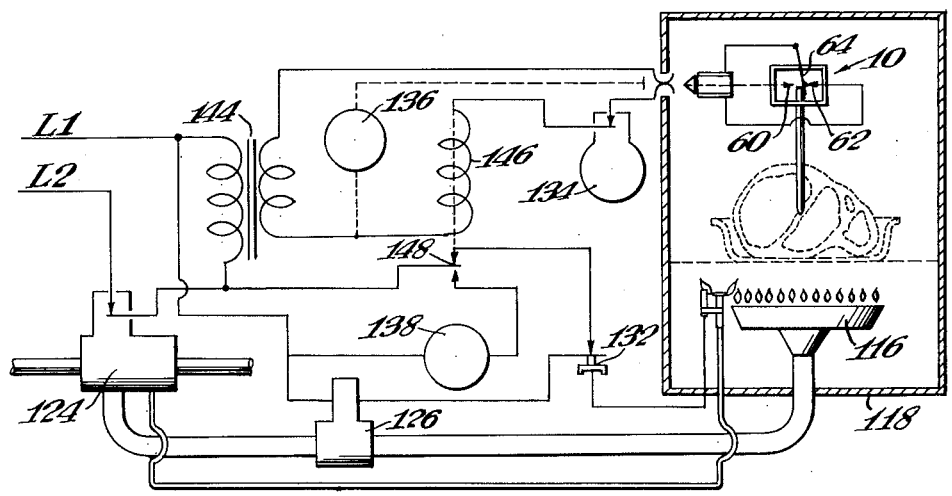
FIG. 4 is a schematic view of another system embodying this invention.

The arrangement and operation of the system shown in FIG. 4 is similar to that of the system shown in FIG. 3 except that a voltage stepdown transformer 144 is provided to lower the voltage at the temperature responsive device 10. In this case, the clock 134 is connected in the lower voltage circuit and when the contacts thereof close, a relay 146 is energized to close a single-pole, double-throw switch means 148 whereby current may flow through the thermostat 124, switch means 148, safety switch 132, and solenoid valve 126. When the roast reaches the desired temperature, the switch member 64 closes with contact 60 to open the circuit causing relay 146 to be de-energized whereupon switch means 148 will move to the other position to energize the indicator light 138. An alarm 136 may or may not be connected, as shown in phantom in FIG. 4, for actuation upon the closing of contact 60 with switch member 64.

Figure 5:
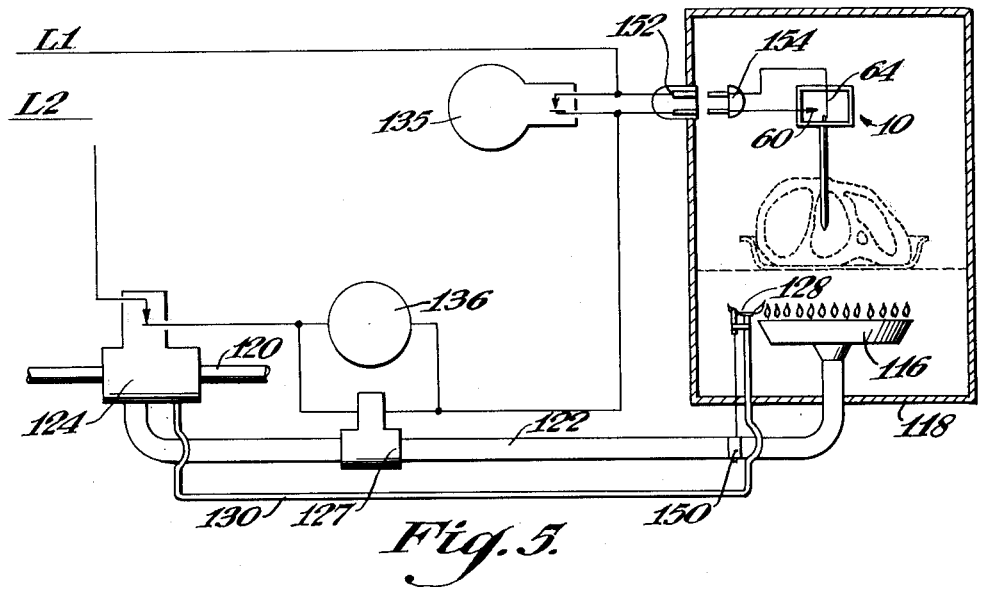
FIG. 5 is a schematic view of another system embodying this invention.
Figure 6:
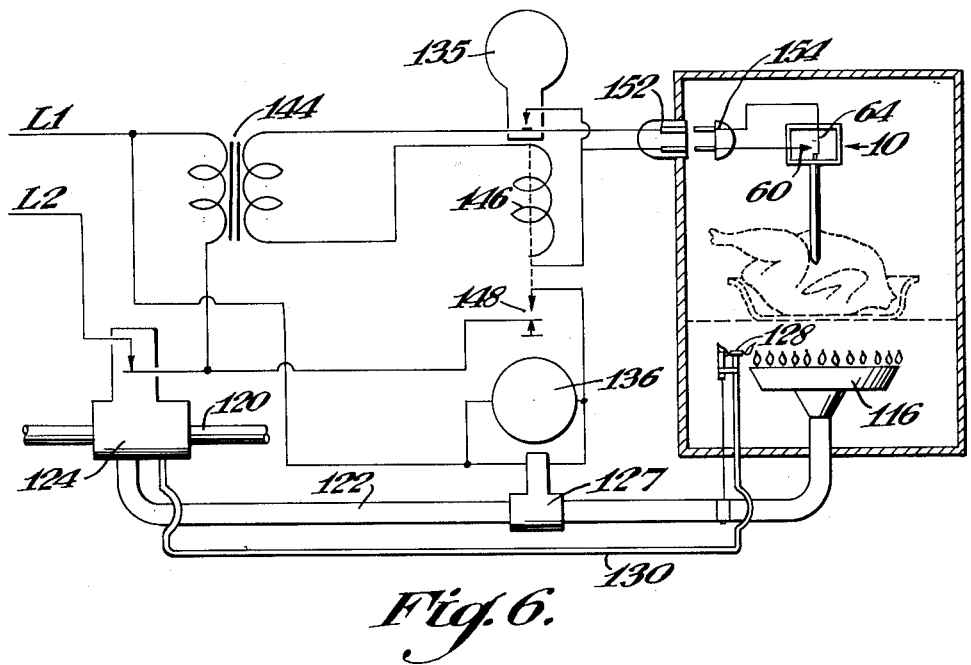
FIG. 6 is a schematic view of another system embodying this invention.

The solenoid valve 126, normally closed except upon energization thereof, is replaced by a normally open solenoid valve 127 which closes upon energization thereof in the system shown in FIGS. 5 and 6. An alarm 136 is placed in parallel therewith to indicate when solenoid valve 127 is energized. By eliminating contact member 62, the switch means becomes a single-pole, single-throw and is retained in an open position by detent 76. Upon element 16 reaching the desired temperature, switch member 64 is released for movement into engagement with contact 60. In this case, the two-way plug 154 cooperates with a suitable two-way socket 152. Furthermore, the systems shown in FIGS. 5 and 6 have pilot safety control features which comprise safety valves 150 that are energized by pilot flames to allow the flow of gas to burners 116. In addition, the contacts of a clock 135 are normally closed but open after a time delay period.

The operation of the system shown in FIG. 5 is as follows: after the meat probe has been inserted into the roast in the manner previously described, the clock timer 135 contacts are closed, for a delayed starting operation, and current will pass serially through the thermostat 124, solenoid valve 127 and clock 135. The solenoid valve 127, being energized, will prevent the flow of gas to burner 116 until the preselected period of time has elapsed whereupon the clock 135 contacts will open to de-energize the solenoid valve 127 and open the valve whereupon burner 116 will be ignited. Upon reaching the desired temperature, switch member 64 will be released and will move into engagement with contact 60 and power will flow through the meat probe, the solenoid valve 127 and thermostat 124 whereupon, with the energization of solenoid valve 127, the flow of gas will be shut off.

FIG. 6 shows a system having voltage stepdown transformer 144 for supplying a lower voltage to the meat probe circuit. In this case, when the clock contacts are closed, relay 146 is energized and holds switch means 148 closed to complete a circuit between the power lines through the thermostat 124 and solenoid valve 127. When the clock contacts open after lapse of a preselected period, the relay 146 will be de-energized thereby causing solenoid valve 127 to be de-energized whereupon fuel may flow to burner 116. When the roast reaches the desired temperature, switch member 64 will engage contact 60 whereby relay 146 will be energized to cause switch means 148 to close and establish a circuit through the solenoid valve 127 to shut off the flow of fuel.

Figure 7:
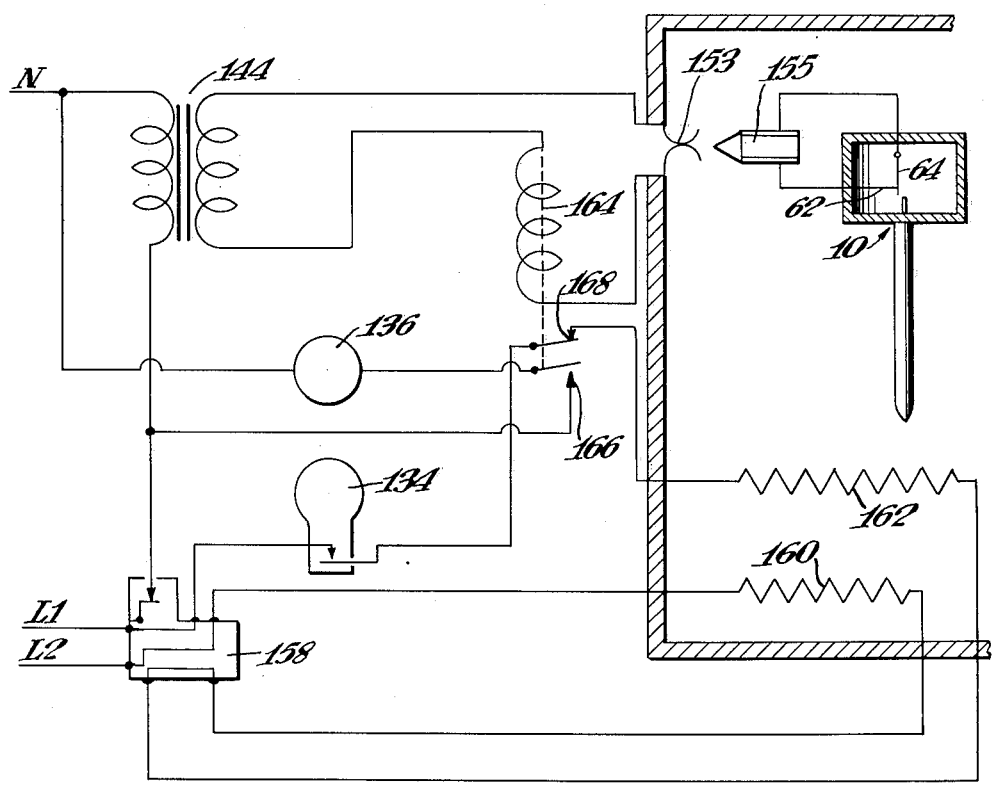
FIG. 7 is a schematic view of another system embodying this invention.

In the system of FIG. 7, a thermostat 158 is used to cycle the power requirements to maintain the oven temperature at the desired level by controlling the flow of current through electric heater coils 160 and 162 which are serially connected through thermostat 158. A relay 164 actuates a pair of single-pole, single-throw switch means 166 and 168. In this case, the temperature responsive device 10 has been modified by eliminating contact 60. A two-way plug 155 cooperates with a two-way jack 153. In operation, when the temperature of element 16 reaches the desired level, switch member 64 is released by retaining means 76 and moves out of engagement with contact 62. After initiating the temperature responsive device in the manner previously described, the clock 134 is set so that the contacts will be closed when the heating operation is in progress. Upon closing of the clock contacts, current will flow through thermostat 158, clock 134, switch means 168 through heater coils 160 and 162 to the other side of the power line. When the meat reaches the desired temperature, the switch elements 64 and 62 open whereupon the relay 164 is de-energized. Switch means 168 opens and switch means 166 closes whereupon power will flow through alarm 136 to notify the cook that the roast has reached the desired temperature.

It is understood that many modifications may be made in the arrangement and details of the parts without departing from the scope of the invention as defined in the claims appended hereto.

We claim:

1. A temperature responsive device for controlling the heating of material in a system having a heater therein, comprising a housing, a temperature sensitive element having an outer portion projecting from said housing and including a sensing element adapted to be inserted into said material, said temperature sensitive element having an inner end within said housing operably connected to said sensing element and being movable in response to temperature changes of said material sensed by said sensing element, motion amplifying means operatively connected to said inner end of said temperature sensitive element and being movable thereby, retaining means carried by said motion amplifying means, switch means supported in said housing and adapted for controlling the energization of the heating means, said switch means including a switch arm movable between controlling positions, said retaining means being engageable with said switch arm for holding said switch arm in one said position and being operable to release said switch arm for movement to another said position when said sensing element reaches a predetermined temperature, and adjusting means on said housing operably connected for selectively positioning said switch arm relative to said retaining means to vary the temperature at which said temperature sensitive element will cause said switch arm to move between said positions.

2. The device of claim 1 wherein indicating means is associated with said device for indicating the temperature of said sensing element, said indicating means comprising a pivotal pointer operatively connected to move in response to movement of said motion amplifying means.

3. The device of claim 1 comprising reset means for moving said switch arm from said other position into engagement with said retaining means.

4. A temperature responsive device comprising a cup-shaped housing having an end wall, temperature sensitive means connected to said end wall and having a sensing element positioned remote therefrom said temperature sensitive means having an inner portion operably connected to said sensing element and extending through said end wall into said housing and being movable relative thereto in response to changes in temperature, lever means disposed within said housing and being operatively connected to said inner portion of said temperature sensitive means for movement therewith, switch means disposed within said housing and including a switch bracket operatively engageable with said lever means, said switch bracket being movable between controlling positions, and adjusting means rotatably received in the open end of said cup-shaped housing and having a portion thereof in operative engagement with said switch bracket, said adjusting means being operable to selectively position said switch bracket and said lever means relative to said switch means to vary the point at which movement of said switch means will cause said switch means to move between said positions.

5. The device of claim 4 wherein a flexible bracket is disposed within said housing, said flexible bracket having one end thereof connected to said housing and having the other end thereof extending upwardly into engagement with said adjusting means, said switch means being carried by the other end of said flexible bracket for bodily movement therewith in response to operation of said adjusting means.

6. A temperature responsive device comprising a housing having an end wall, an elongated temperature responsive element projecting from said end wall, said element including an expansible sensing element positioned remote from said end wall and an actuating element extending through said end wall and operably connected to said sensing element for movement thereby in response to temperature changes of said sensing element, a pair of movement amplifying levers supported within said housing, one of said levers being operably engageable with said actuating element for movement thereby, the other said lever being rotatable by said one lever and having detent means thereon, a switch casing supported in said housing and having a movable portion overlying said detent means, switch means in said switch casing including a switch arm movable independently of said movable portion between controlling positions, reset means carried by said housing for positioning said switch arm in operative engagement with said detent for holding said switch arm in one controlling position, said detent means being operable to release said switch arm for movement to another controlling position upon movement of said one lever when said sensing element reaches a predetermined temperature, and adjusting means on said housing and engageable with said movable portion for selectively positioning said switch arm relative to said detent means to vary the temperature at which said sensing element is effective for causing release of said switch arm.

References Cited in the file of this patent
UNITED STATES PATENTS

| | | |
|---|---|---|
| 2,820,130 | Dadson | Jan. 14, 1958 |
| 2,877,836 | Wolfgram | Mar. 17, 1959 |